Jan. 9, 1934.  H. R. RICARDO  1,942,571
TWO-STROKE INTERNAL COMBUSTION ENGINE
Filed May 12, 1930
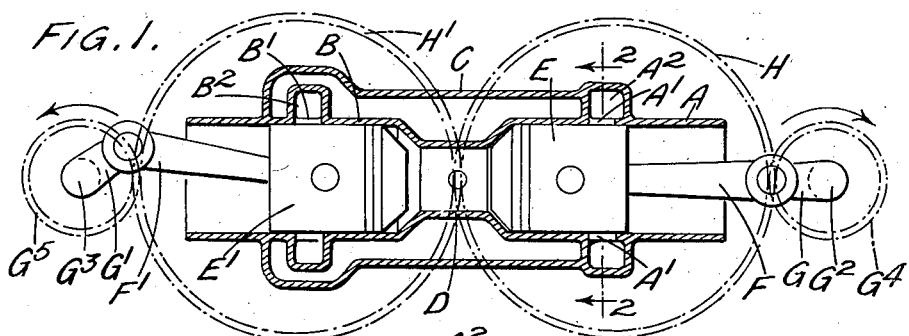
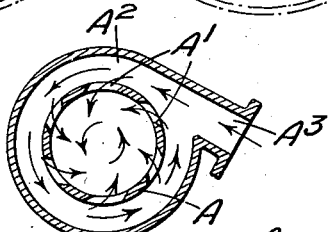
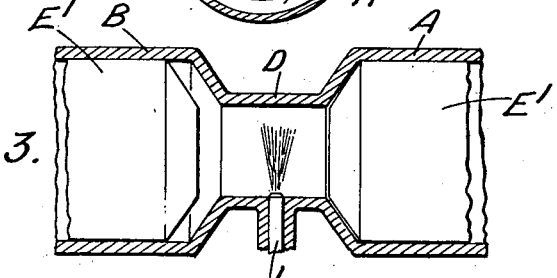
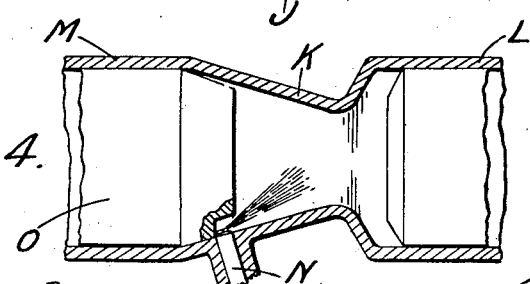
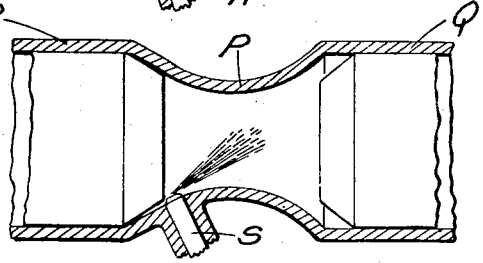

Patented Jan. 9, 1934

1,942,571

UNITED STATES PATENT OFFICE

1,942,571
TWO-STROKE INTERNAL COMBUSTION ENGINE

Harry Ralph Ricardo, London, England

Application May 12, 1930, Serial No. 451,730, and in Great Britain May 21, 1929

9 Claims. (Cl. 123—51)

This invention relates to internal combustion engines of the liquid fuel injection type operating on the two-stroke cycle of the kind comprising two coaxial cylinders placed end to end and having between them a common combustion chamber the diameter of which is less than the diameter of the cylinder bores, one of the cylinders being provided with one or more exhaust ports and the other with one or more inlet ports through which air is admitted in such a manner as to cause it to rotate about the cylinder axis.

The object of the invention is to provide an engine of the above type in which a better admixture of the fuel and air and hence more complete combustion, will be obtained.

To this end an internal combustion engine of the above type according to the present invention is so constructed that movement in the axial direction is imparted to the rotating air charge as a whole during the fuel injection period. Thus in a convenient arrangement the reciprocating movements of the pistons respectively in the two cylinders of an internal combustion engine of the above type are according to the present invention so relatively out of phase as to impart the desired axial movement to the rotating air charge within the combustion chamber during the fuel injection period. In this way the air charge, in addition to sweeping across the fuel jet or jets by reason of the rotation of such air charge about the cylinder axis is moved axially so that substantially the whole of the air charge tends to be brought into contact with the jet or jets.

The number of fuel jets employed as well as the position and direction thereof may vary, but in one convenient arrangement the fuel is injected substantially radially into the combustion chamber in one or more jets. Alternatively, the fuel may be delivered in one or more jets the mean direction of which has a substantial component in a direction parallel to the axis of the combustion chamber. In any case the period during which fuel injection takes place in relation to the piston movements may vary according to the position, direction and number of fuel jets and to the other constructional features of the engine.

The form of the combustion chamber may vary but is conveniently circular or approximately circular in cross-section in order to present the minimum resistance to the rotation of the air charge. For example the combustion chamber may be cylindrical and may be connected to the two cylinder bores by expanding conical end portions, the circumferential portions of the piston heads being correspondingly formed conical or bevelled to conform to the conical walls connecting the cylindrical combustion chamber to the cylinder bores.

Alternatively the combustion chamber may be of either symmetrical or asymmetrical Venturi form, the circumferential portions of the piston faces in this case also being bevelled or formed conical to conform to the tapering parts of the combustion chamber wall to which they closely approach.

Further, where a combustion chamber of asymmetrical Venturi form is employed, that end of such chamber which has the more gradual taper preferably lies towards and communicates with the cylinder in which the exhaust port or ports are formed so that the combustion chamber creates as little disturbance as possible in the rotating scavenging air charge as it passes therethrough from the inlet ports in one cylinder towards the exhaust ports in the other.

The invention may be carried into practice in various ways but one construction according to this invention together with certain modifications are shown somewhat diagrammatically in the accompanying drawing, in which Figure 1 is a longitudinal section through one form of internal combustion engine according to this invention.

Figure 2 is a section on the line 2—2 of Figure 1.

Figure 3 is a longitudinal section on an enlarged scale through the combustion chamber of the engine shown in Figures 1 and 2, the section being taken at right angles to that of Figure 1, and Figures 4 and 5 are similar views to Figure 3 of two alternative forms of combustion chamber which may be employed in an engine according to this invention.

In the construction illustrated in Figures 1, 2 and 3 the engine comprises two coaxial cylinders A and B provided with a common water jacket C and arranged end to end with a common combustion chamber D between them, this combustion chamber being of cylindrical form and having a diameter which is less than that of the cylinder bores, and may be for example as shown of the order of from one half to three quarters of the diameter of each cylinder bore. Formed in the cylinder A are inlet ports $A^1$ communicating through an annular inlet chamber $A^2$ with an inlet passage $A^3$, the inlet ports $A^1$ being arranged tangentially with respect to the cylinder A as shown in Figure 2, so that the air charge entering therethrough will tend to rotate about the cylinder axis. Formed in the wall of the cylinder B are exhaust ports $B^1$ communicating with an annular exhaust chamber $B^2$.

Disposed within the cylinders A and B are pistons E, $E^1$ connected by connecting rods F, $F^1$ to similar cranks G, $G^1$ on crank shafts $G^2$, $G^3$. The crankshafts $G^2$, $G^3$ carry gear wheels $G^4$, $G^5$ meshing with gear wheels H, $H^1$ which themselves are in mesh with one another so that the crankshafts $G^2$, $G^3$ rotate in opposite directions. The arrangement is such that the cranks G, $G^1$ to which the two pistons E, $E^1$ are respectively coupled are out of phase so that one piston, for example E, reaches its dead centre before the other, $E^1$, whereby a reciprocating axial movement is imparted to the air charge within the combustion chamber D at the end of the compression period in addition to its rotational motion about the combustion chamber axis caused by the tangential entry of the air charge through the inlet ports $A^1$. Arranged in the wall of the combustion chamber D is a sprayer J adapted to deliver a jet or jets substantially radially into the combustion chamber.

It will be seen that since the air charge not only rotates about the combustion chamber axis but also has an axial movement imparted thereto towards the end of the compression period as described above, substantially the whole of such air charge tends to be brought into contact with the liquid fuel delivered through the jet J into the combustion chamber. If desired one or more radial jets may be provided, such jets either lying in the same or in different transverse planes with respect to the combustion chamber axis.

In the alternative construction illustrated in Figure 4 the combustion chamber K is of asymmetrical Venturi form so as to facilitate the passage of the burnt gases and the fresh air charge from the cylinder L containing the inlet ports through the combustion chamber to the cylinder M containing the exhaust ports. In this construction the fuel may be injected radially as in the construction shown in Figures 1, 2 and 3. Alternatively, however, the fuel may be injected as shown in Figure 4 obliquely across the combustion chamber from a jet N located in one end portion of the circumferential wall thereof, a portion of the piston O in the cylinder M being conveniently cut away to allow of the placing of the fuel sprayer in this position.

In yet another alternative arrangement indicated in Figure 5, the combustion chamber P lying between the cylinders Q and R is of symmetrical Venturi form while the fuel injection device S is placed towards one end of the combustion chamber and delivers a spray obliquely across it.

In each of the constructions illustrated above the faces of the pistons are conveniently cut away to conform to the portions of the cylinder adjacent to the combustion chamber to which they closely approach.

It is to be understood that the arrangements shown in the drawings are given by way of example only and that the form of the combustion chamber as well as the position, number and direction of the fuel jets may be varied without departing from this invention. Further, the extent to which the reciprocating movements of the two pistons in an engine according to this invention are out of phase may vary. In one convenient arrangement, however, the two cranks may have an effective angular displacement relatively to one another such that when one piston is at its dead centre, the crank on which the other piston acts is angularly displaced by approximately 20° from its dead centre.

It will be seen that with an engine according to this invention since the air charge has both a rotational movement about the combustion chamber axis and a movement parallel to such axis during the fuel injection period, substantially the whole of the air tends to be brought into contact with the fuel jet or jets. Further, by employing a combustion chamber having a mean diameter which is less than the diameter of the cylinder bores, the rate of angular rotation of the charge in the combustion chamber tends to be increased since the tangential velocity imparted to it as it enters the cylinder bore is acting at a smaller radius when the air charge is forced into the combustion chamber than when it is in the cylinder, whereby the air charge can be caused to execute a complete rotation during the fuel injection period.

What I claim as my invention and desire to secure by Letters Patent is:—

1. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber between the adjacent ends of the cylinders having a diameter less than that of the cylinder bores, pistons in the two cylinders controlling the ports, means for injecting fuel into the combustion chamber, and means including interconnected rotary members on which the pistons act and by which they are reciprocated, said means being so constructed that the displacement of the rotating air charge in the combustion chamber during the fuel injection period by the two pistons differs, whereby axial movement is imparted to the charge.

2. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber between the adjacent ends of the cylinders having a diameter less than that of the cylinder bores, means for injecting fuel into the combustion chamber, pistons in the two cylinders controlling the ports, rotary members on which the pistons act and by which they are reciprocated, and an interconnection between these rotary members such that the reciprocating movements of the pistons within their cylinders are so relatively out of phase as to impart movement in the axial direction to the rotating air charge as a whole within the combustion chamber during the fuel injection period.

3. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber between the adjacent ends of the cylinders having a diameter less than that of the cylinder bores and communicating with these bores through tapered parts, means for injecting fuel into the combustion chamber, pistons in the two cylinders controlling the ports and having their faces so formed as substantially to conform to the said tapered parts, and means including interconnected rotary members on which the pistons act and by which they are reciprocated, said means being so constructed that the displacement of the rotating air charge in the combustion chamber during the fuel injection period by the two pistons differs, whereby axial movement is imparted to the charge.

4. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber between the adjacent ends of the cylinders having a diameter less than that of the cylinder bores and communicating with such bores through tapered parts, pistons in the two cylinders controlling the ports and having their faces formed so as to conform to the said tapered parts, means for injecting fuel into the combustion chamber, rotary members on which the pistons act and by which they are reciprocated, and an interconnection between these rotary members such that the reciprocating movements of the pistons within the cylinders are so relatively out of phase as to impart axial movement to the air charge within the combustion chamber during the fuel injection period.

5. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber of Venturi form interposed between the adjacent ends of the cylinders, the means diameter of this combustion chamber being less than the diameter of the cylinder bores, means for injecting fuel into the combustion chamber, pistons in the two cylinders controlling the ports, rotary members on which the pistons act and by which they are reciprocated, and an interconnection between these rotary members such that the reciprocating movements of the pistons within their cylinders are so relatively out of phase as to impart movement in the axial direction to the rotating air charge as a whole within the combustion chamber during the fuel injection period.

6. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber between the adjacent ends of the cylinders having a diameter less than that of the cylinder bores, pistons in the two cylinders controlling the ports, means for injecting at least one jet of fuel in a substantially radial direction into the combustion chamber, and means including interconnected rotary members on which the pistons act and by which they are reciprocated, said means being so constructed that the displacement of the rotating air charge in the combustion chamber during the fuel injection period by the two pistons differs, whereby axial movement is imparted to the charge.

7. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber between the adjacent ends of the cylinders having a diameter less than that of the cylinder bores, means for injecting at least one jet of fuel in a substantially radial direction into the combustion chamber, pistons in the two cylinders controlling the ports, rotary members on which the pistons act and by which they are reciprocated, and an interconnection between these rotary members such that the reciprocating movements of the pistons within their cylinders are so relatively out of phase as to impart movement in the axial direction to the rotating air charge as a whole within the combustion chamber during the fuel injection period.

8. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber between the adjacent ends of the cylinders having a diameter less than that of the cylinder bores and communicating with such bores through tapered parts, pistons in the two cylinders controlling the ports and having their faces formed so as to conform to the said tapered parts, means for injecting at least one jet of fuel in a substantially radial direction into the combustion chamber, rotary members on which the pistons act and by which they are reciprocated, and an interconnection between these rotary members such that the reciprocating movements of the pistons within the cylinders are so relatively out of phase as to impart axial movement to the air charge within the combustion chamber during the fuel injection period.

9. An internal combustion engine of the liquid fuel injection type operating on the two-stroke cycle including in combination two coaxial cylinders placed end to end, one cylinder being provided with an exhaust port and the other with an inlet port directing the air charge in a rotational path about the cylinder axis, a common combustion chamber of Venturi form interposed between the adjacent ends of the cylinders, the mean diameter of this combustion chamber being less than the diameter of the cylinder bores, means for injecting at least one jet of fuel in a substantially radial direction into the combustion chamber, pistons in the two cylinders controlling the ports, rotary members on which the pistons act and by which they are reciprocated, and an interconnection between these rotary members such that the reciprocating movements of the pistons within their cylinders are so relatively out of phase as to impart movement in the axial direction to the rotating air charge as a whole within the combustion chamber during the fuel injection period.

HARRY RALPH RICARDO.